United States Patent [19]
Yoshikawa et al.

[11] Patent Number: 5,096,937
[45] Date of Patent: Mar. 17, 1992

[54] ULTRAVIOLET-HARDENABLE ADHESIVE

[75] Inventors: Toshiharu Yoshikawa, Nagoya; Shozou Sugiura, Toyoake, both of Japan

[73] Assignee: Menicon Co., Ltd., Aichi, Japan

[21] Appl. No.: 565,561

[22] Filed: Aug. 9, 1990

Related U.S. Application Data

[62] Division of Ser. No. 426,199, Oct. 25, 1989, Pat. No. 5,009,731.

[51] Int. Cl.$^5$ .................... C08F 30/08; C08F 2/50
[52] U.S. Cl. ............................ 522/99; 526/279
[58] Field of Search ................ 522/99; 526/279

[56] References Cited

U.S. PATENT DOCUMENTS 4,697,026  9/1987  Lee et al. ..................... 522/99
4,972,005  11/1990  Aoki et al. ................... 522/99

FOREIGN PATENT DOCUMENTS 2101150  1/1983  United Kingdom ........... 522/99

*Primary Examiner*—Marion E. McCamish
*Assistant Examiner*—Susan Berman
*Attorney, Agent, or Firm*—Oliff & Berridge

[57] ABSTRACT

An ultraviolet-hardenable adhesive for bonding a waterswellable, ophthalmic-lens blank to a support member, the adhesive containing at least one photo-hardenable silicone oil, and at least one photoinitiator, the at least one silicone oil being selected from polysiloxanes represented by the following general formula:

wherein
each of $R_1$ to $R_3$ is methyl or ethyl; $n_1$, $n_2$ and $n_3$ are positive integers which satisfy the specified three formulas;

$X_1$ is $-(CH_2)_3-$, or $$-(CH_2)_3OCH_2\underset{\underset{OH}{|}}{C}HCH_2-;$$

$A_1$ is $$-O-\underset{\underset{}{||}}{C}-\underset{\underset{}{|}}{\overset{R_4}{C}}=CH_2,$$

wherein $R_4$ is hydrogen or methyl; and $B_1$ is

A method of bonding a lens blank to a support member with an adhesive, and a processing of manufacturing a lens using an adhesive, are also disclosed.

7 Claims, 1 Drawing Sheet

FIG. 1

ULTRAVIOLET-HARDENABLE ADHESIVE

This is a division of application Ser. No. 07/426,199 filed Oct. 25, 1989, now U.S. Pat. No. 5,009,731 issued Apr. 23, 1991.

BACKGROUND OF THE INVENTION

1. Field of the Invention

The present invention relates to an ultraviolet-hardenable adhesive for bonding a water-swellable, ophthalmic-lens blank to a support member in producing a water-swellable ophthalmic lens such as a contact lens and an intraocular lens, a method of bonding a water-swellable ophthalmic-lens blank to a support member with an adhesive, and a process of producing a water-swellable ophthalmic lens using an adhesive.

2. Discussion of the Prior Art

Various adhesives are available for industrial and domestic uses. In particular, when an ophthalmic-lens blank is subjected to workings, such as machining and polishing, and/or necessary treatments in producing an ophthalmic lens such as a contact lens and an intraocular lens, an adhesive is used to bond the lens blank to a support member. Since the worked lens must be separated from the support member, it is required to use an adhesive which permits the lens to easily be separated from the support member.

U.S. Pat. No. 4,619,082 (Dent et al.), teaches use of a molten wax for bonding a lens blank to a support member. Molten wax normally melts at 60 to 70° C., and the wax in molten state is used as an adhesive. Therefore, if it takes a comparatively long time to finish the step of bonding the lens block to the support member, the wax is hardened during the step, whereby the lens blank may not accurately be positioned relative to the support member.

Further, it has been proposed to use other sorts of adhesives, for example a room temperature-hardenable adhesive, a cyanoacrylate-type adhesive ("instant adhesive") and a two-part adhesive. The room temperature-hardenable adhesive has the same problem as the above-indicated molten wax, because this adhesive is hardened due to moisture in ambient air, which acts as a catalyst. Specifically, if a comparatively long time is taken to finish the bonding step, the adhesive is hardened during the step. Thus, the adhesive is of low controllability in use thereof and is not suitable for this purpose. In the case of the cyanoacrylate-type adhesive, a lens blank is instantly secured to a support member due to the specific nature of the adhesive, therefore the lens blank may not accurately be positioned relative to the support member. After having been subjected to the workings and/or treatments, the produced lens may not easily be separated from the support member. Furthermore, the two-part adhesive has the problem of low controllability in use for bonding a lens blank to a support member, because the adhesive is hardened upon mixture of the two parts or fluids.

In particular, the conventional adhesives are not suitable for bonding a water-absorbable or water-swellable, ophthalmic-lens blank to a support member, due to high affinity of the adhesives to the material of the lens blank. Specifically, the conventional adhesives have the problem of penetrating into the lens blank and thereby damaging the shaped optical surface of the lens blank.

SUMMARY OF THE INVENTION

It is therefore an object of the present invention to provide an ultraviolet-hardenable adhesive, which does not adversely influence, or damage, the lens blank or the worked lens, used for bonding a water-swellable, ophthalmic-lens blank to a support member in producing a water-swellable ophthalmic lens, such as a contact lens and an intraocular lens, a method of bonding a water-swellable ophthalmic-lens blank to a support member with an adhesive, and a process of producing a water-swellable ophthalmic lens using an adhesive.

It is another object of the invention to provide a bonding technique used for bonding a water-swellable ophthalmic-lens blank to a support member in producing a required water-swellable ophthalmic lens.

It is yet another object of the invention to provide a bonding technique free from the problem of inaccurate positioning of a water-swellable, ophthalmic-lens blank relative to a support member, by employing an ultraviolet-hardenable adhesive which is not instantly hardened and is controllable regarding a time to initiate the hardening thereof, and which does not adversely influence, or damage, the lens blank or the worked lens.

The above objects have been achieved by the present invention. According to a first aspect of the invention there is provided an ultraviolet-hardenable adhesive used for bonding a water-swellable, ophthalmic-lens blank to a support member, in producing a water-swellable ophthalmic lens, comprising at least one photo-hardenable silicone oil, and at least one photoinitiator, the at least one silicone oil being selected from the group consisting of polysiloxanes represented by the following general formula (I):

wherein
each of $R_1$ to $R_3$ is methyl or ethyl; $n_1$, $n_2$, and $n_3$ are positive integers, respectively, which satisfy the following formulas:

$$40 \leq n_1 + n_2 + n_3 \leq 1500$$

$$0.04 \leq \frac{n_2}{n_1 + n_2 + n_3} \leq 0.6$$

$$0.002 \leq \frac{n_3}{n_1 + n_2 + n_3} \leq 0.2;$$

$X_1$ is $-(CH_2)_3$, or $A_1$ is

, wherein
R$_4$ is hydrogen or methyl; and
B$_1$ is

Since the above-indicated ultraviolet-hardenable adhesive have substantially no affinity to a water-swellable ophthalmic-lens blank, the adhesive is very suitable for bonding the lens blank to a support member, in producing a water-swellable ophthalmic lens such as a contact lens and an intraocular lens, specifically by subjecting the lens blank bonded to the support member, to workings such as machining and polishing, and/or other necessary treatments. In particular, the present adhesive provides the advantages of: (a) exhibiting no adverse influences to the standards on water-swellable lenses (e.g., base curve, power), the lens surfaces, or the lens material; (b) being free from the problem of inaccurate positioning of the lens blank relative to the support member, because the adhesive is not hardened instantly; (c) exhibiting a sufficient bonding force which enables workings such as machining and polishing on the lens blank bonded to the support member, and which permits the worked lens to easily be separated from the support member, without any adverse influences to the water-swellable lens; and (d) being controllable regarding a time to initiate the hardening thereof and thereby having improved utility or ease to use.

In the polysiloxanes represented by the above-indicated general formula (I), it is recommended that the n$_1$, n$_2$, and n$_3$ appearing in the general formula (I) satisfy the following formulas:

$$70 \leq n_1 + n_2 + n_3 \leq 680$$

$$0.08 \leq \frac{n_2}{n_1 + n_2 + n_3} \leq 0.2$$

$$0.05 \leq \frac{n_3}{n_1 + n_2 + n_3} \leq 0.1$$

In a preferred embodiment of the invention, the ultraviolet-hardenable adhesive further comprises at least one photosensitizer.

In another embodiment of the invention, the ultraviolet-hardenable adhesive further comprises at least one adjusting constituent, i.e., at least one polysiloxane for adjusting a bonding force produced by the adhesive, the at least one polysiloxane (at least one adjusting constituent) being represented by the following general formula (II):

wherein
each of R$_5$ to R$_7$ is methyl or ethyl;
n$_4$ and n$_5$ are positive integers, respectively, which satisfy the following formulas:

$$40 \leq n_4 + n_5 \leq 1500$$

$$0.002 \leq \frac{n_5}{n_4 + n_5} \leq 0.2;$$

X$_2$ is $-(CH_2)_3$, or and
A$_2$ is

, wherein R$_8$ is hydrogen or methyl. While various silicone oils capable of producing different bonding forces, are prepared by changing the n$_1$, n$_2$ and n$_3$ appearing in the general formula (I), the overall bonding force produced by the present adhesive, are adjusted to a suitable degree by adding thereto an appropriate amount of the compound(s) represented by the general formula (II), according to the sort of a material to be bonded thereby, and/or the purpose of bonding.

In the polysiloxanes represented by the above-indicated general formula (II), it is recommended that the n$_4$ and n$_5$ appearing in the general formula (II) satisfy the following formulas:

$$70 \leq n_4 + n_5 \leq 680$$

$$0.05 \leq \frac{n_5}{n_4 + n_5} \leq 0.1$$

Regarding the proportions of the at least one silicone oil of the formula (I) and the at least one adjusting constituent of the formula (II) in the ultraviolet-hardenable adhesive, it is recommended that the adhesive contain 20 to 100 parts by weight of the at least one silicone oil per 100 parts by weight of the sum of the at least one silicone oil and the at least one adjusting constituent, that is, the adhesive contain 100 to 20 parts by weight of the at least one adjusting constituent per 100 parts by weight of the sum of those constituents. It is most recommendable that the adhesive contain 70 to 80 parts by weight of the at least one silicone oil and 30 to 20 parts by weight of the at least one adjusting constituent, per 100 parts by weight of those constituents.

The ultraviolet-hardenable adhesive of the present invention may further comprise at least one of stabilizer, filler, and other adhesive additives, as needed.

According to a second aspect of the present invention, there is provided a method of bonding a water-swellable, ophthalmic-lens blank to a support member so as to subject the ophthalmic-lens blank to working and/or treatment, in producing a water-swellable ophthalmic lens, comprising the steps of (1) preparing an ultraviolet-hardenable adhesive comprising at least one photo-hardenable silicone oil, and at least one photoinitiator, the at least one silicone oil being selected from the group consisting of polysiloxanes represented by the following general formula (I):

$$\begin{array}{c}R_1\\R_1-SiO\\R_1\end{array}\left[\begin{array}{c}R_2\\|\\SiO\\|\\R_2\end{array}\right]_{n_1}\left[\begin{array}{c}CH_3\\|\\SiO\\|\\X_1\\|\\A_1\end{array}\right]_{n_2}\left[\begin{array}{c}CH_3\\|\\SiO\\|\\B_1\end{array}\right]_{n_3}\begin{array}{c}R_3\\/\\Si-R_3\\\backslash\\R_3\end{array} \quad (I)$$

, wherein
each of $R_1$ to $R_3$ is methyl or ethyl;
$n_1$, $n_2$ and $n_3$ are positive integers, respectively, which satisfy the following formulas:

$$40 \leq n_1 + n_2 + n_3 \leq 1500$$

$$0.04 \leq \frac{n_2}{n_1 + n_2 + n_3} \leq 0.6$$

$$0.002 \leq \frac{n_3}{n_1 + n_2 + n_3} \leq 0.2;$$

$X_1$ is $-(CH_2)_3$, or $$-(CH_2)_3OCH_2\underset{\underset{OH}{|}}{C}HCH_2-;$$

$A_1$ is $$-O-\underset{\underset{O}{\|}}{C}-\underset{\underset{R_4}{|}}{C}=CH_2$$

wherein
$R_4$ is hydrogen or methyl; and
$B_1$ is $$-\phi, \ -(CH_2)_2-\phi,$$

-continued $$-(CH_2)_3-\phi, \ -CH_2-\underset{\underset{CH_3}{|}}{C}H-\phi$$

$$-(CH_2)_3OCH_2\underset{\underset{OH}{|}}{C}HCH_2O-\phi, \text{ or}$$

$$-(CH_2)_3OCH_2\underset{\underset{OH}{|}}{C}HCH_2O\underset{\underset{O}{\|}}{C}-\phi$$

(2) bonding the ophthalmic-lens blank to the support member with the ultraviolet-hardenable adhesive.

According to a third aspect of the present invention, there is provided a process of producing a water-swellable, ophthalmic lens, comprising the steps of (a) preparing an ultraviolet-hardenable adhesive comprising at least one photo-hardenable silicone oil, and at least one photoinitiator, the at least one silicone oil being selected from the group consisting of polysiloxanes represented by the following general formula (I):

$$\begin{array}{c}R_1\\R_1-SiO\\R_1\end{array}\left[\begin{array}{c}R_2\\|\\SiO\\|\\R_2\end{array}\right]_{n_1}\left[\begin{array}{c}CH_3\\|\\SiO\\|\\X_1\\|\\A_1\end{array}\right]_{n_2}\left[\begin{array}{c}CH_3\\|\\SiO\\|\\B_1\end{array}\right]_{n_3}\begin{array}{c}R_3\\/\\Si-R_3\\\backslash\\R_3\end{array} \quad (I)$$

, wherein
each of $R_1$ to $R_3$ is methyl or ethyl;
$n_1$, $n_2$ and $n_3$ are positive integers, respectively, which satisfy the following formulas:

$$40 \leq n_1 + n_2 + n_3 \leq 1500$$

$$0.04 \leq \frac{n_2}{n_1 + n_2 + n_3} \leq 0.6$$

$$0.002 \leq \frac{n_3}{n_1 + n_2 + n_3} \leq 0.2;$$

$X_1$ is $-(CH_2)_3$, or $$-(CH_2)_3OCH_2\underset{\underset{OH}{|}}{C}HCH_2-;$$

$A_1$ is $$-O-\underset{\underset{O}{\|}}{C}-\underset{\underset{R_4}{|}}{C}=CH_2$$

, wherein
$R_4$ is hydrogen or methyl; and
$B_1$ is (b) bonding a water-swellable, ophthalmic-lens blank to a support member with the ultraviolet-hardenable adhesive, (c) exposing the bonded ophthalmic-lens blank and support member to ultraviolet rays so as to harden the adhesive, and (d) subjecting the ophthalmic-lens blank to working and/or treatment so as to form the lens blank into a desired water-swellable ophthalmic lens, and (e) separating the ophthalmic lens from the support member.

In the above-indicated producing process, the water-swellable lens blank bonded to the support member with the ultraviolet-hardenable adhesive, may be subjected to working such as machining and polishing. After the working and/or treatment, the produced lens is separated from the support member, preferably by treating the bonded articles with a non-polar solvent, for example immersing the articles in the solvent, and thereby swelling the adhesive. Due to the swelling of the adhesive, the lens is easily separated from the support member. Alternatively, the bonded lens is separated from the support member by treating with an aqueous solvent such as water and salt water. In the latter case, the lens itself is swollen as a result of absorbing water, and the lens is easily separated from the support member.

It is noted that in the present invention the "water-swellable" ophthalmic-lens blanks encompass all the ophthalmic-lens blanks that are considered as water-swellable or water-absorbable. In other words, the present invention is applied to not only the lens blanks having a comparatively high water content, for example of 70% to 80%, those having a comparatively low water content, for example of 30% to 40%, but also those having a still lower water content.

DETAILED DESCRIPTION OF THE INVENTION

The present invention provides an ultraviolet-hardenable adhesive containing, as a major constituent, at least one photo-hardenable or light-hardenable silicone oil which is polymerized and hardened due to exposure to light (preferably, ultraviolet) and thereby produces a sufficient bonding force. The at least one silicone oil is selected from polysiloxanes represented by the following general formula (I):

, wherein
each of $R_1$ to $R_3$ is methyl or ethyl (the $R_1$ to $R_3$ may be either identical with each other, or different from each other);
$n_1$, $n_2$ and $n_3$ are positive integers, respectively, which satisfy the following formulas:

$$40 \leq n_1 + n_2 + n_3 \leq 1500$$

$$0.04 \leq \frac{n_2}{n_1 + n_2 + n_3} \leq 0.6$$

$$0.002 \leq \frac{n_3}{n_1 + n_2 + n_3} \leq 0.2;$$

$X_1$ is $-(CH_2)_3$, or

$A_1$ is

, wherein
$R_4$ is hydrogen or methyl; and
$B_1$ is

There will be described the process of synthesizing the photo-hardenable silicone oil represented by the general formula (I). In the following description, numbered or non-numbered symbols, such as $R_1$, $n_1$, $m_1$ and l, used in the formulas (I) to (VIII), <a> to <f> and <a'> to <f'>, means the same atom or group, or the same number.

(1) Synthesis of Intermediate Product <a>

<a>

The above intermediate product <a> is obtained by opening the ring of each of the two kinds of cyclosiloxanes represented by the formulas (III) and (IV), and reacting those compounds with the disiloxane represented by the formula (V), the disiloxane acting as a reaction stopper.

(III)

(IV)

(V)

As the cyclosiloxane represented by the formula (III), preferably is used octamethylcyclotetrasiloxane, and hexamethylcyclotrisiloxane.

As the cyclosiloxane represented by the formula (IV), preferably is used 1, 3, 5, 7-tetramethylcyclotetrasiloxane.

As the disiloxane represented by the formula (V), preferably is used hexamethyldisiloxane, or hexaethyldisiloxane.

(2) Synthesis of Intermediate Product <b>

The intermediate product <b> represented by the following formula is obtained by subjecting the intermediate product <a> to addition reaction with (i) silyl compound of unsaturated alcohol having a polymerizing double bond, such as allyloxytrimethylsilane and allyloxytriethylsilane, and (ii) aromatic compound having an alkenyl group, such as styrene, α-methylstyrene, and allylbenzene. In this reaction, a platinum group catalyst is used.

<b>

, wherein R9 is methyl or ethyl.

(3) Synthesis of Intermediate Product <c>

The intermediate product <c> represented by the following formula is obtained by subjecting the intermediate product <b> to hydrolysis of the pendant silyl ether group thereof.

<c>

(4) Synthesis of Intermediate Product <d>

The intermediate product <d> represented by the following formula is obtained by reacting the intermediate product <a> with (i) allylglycidyl ether and (ii) aromatic compound having an alkenyl group, such as α-methylstyrene and allylbenzene.

<d>

(5) Synthesis of Polysiloxane <e> (Silicone Oil (I))

The polysiloxane <e> represented by the following formula, one of silicone oils (I), is obtained by reacting the intermediate product <c> with (i) acid chloride such as methacryloyl chloride and acryloyl chloride, or (ii) acid anhydride such as methacrylic anhydride and acrylic anhydride.

<e>

(6) Synthesis of Polysiloxane <f> (Silicone Oil (I))

The polysiloxane <f> represented by the following formula, one of silicone oils (I), is obtained by reacting the intermediate product <d> with unsaturated carboxylic acid such as methacrylic acid and acrylic acid.

In summary, the polysiloxane <e> or <f>, as the photo-hardenable silicone oil (I) contained in the adhesive of the present invention, is synthesized in the following reaction path.

The ultraviolet-hardenable adhesive of the invention preferably contains at least one adjusting constituent for adjusting a bonding force produced by the adhesive. The at least one adjusting constituent is selected from polysiloxanes represented by the following general formula (II):

wherein
each of $R_5$ to $R_7$ is methyl or ethyl; $n_4$ and $n_5$ are positive integers, respectively, which satisfy the following formulas:

$$40 \leq n_4 + n_5 \leq 1500$$

$$0.002 \leq \frac{n_5}{n_4 + n_5} \leq 0.2;$$

$X_2$ is $-(CH_2)_3$, or and
$A_2$ is

, wherein $R_8$ is hydrogen or methyl.

The polysiloxane (i.e., adjusting constituent) represented by the formula (II), is synthesized in a manner similar to the above-described manner in which the polysiloxane (i.e., photo-hardenable silicone oil) (I) is synthesized, as follows:

(1) Synthesis of Intermediate Product <p>

Similar to the synthesis of the intermediate product <a>, the intermediate product <p> is obtained by using the two kinds of cyclosiloxanes represented by the formulas (VI) and (VII), and the disiloxane (stopper) represented by the formula (VIII).

(2) Synthesis of Intermediate Product <q>

The intermediate product <q> represented by the following formula is obtained by subjecting the intermediate product <p> to addition reaction with (i) silyl compound of unsaturated alcohol having a polymerizing double bond, such as allyloxytrimethylsilane and allyloxytriethylsilane. In this reaction, a platinum group catalyst is used.

(3) Synthesis of Intermediate Product <r>

The intermediate product <r> represented by the following formula is obtained by subjecting the intermediate product <q> to hydrolysis of the pendant silyl ether group thereof, and thereby removing the group.

(4) Synthesis of Intermediate Product <s>

The intermediate product <s> represented by the following formula is obtained by reacting the intermediate product <p> with allylglycidyl ether.

(5) Synthesis of Polysiloxane <5> (Compound (II))

The polysiloxane <t> represented by the following formula, as one of compounds (adjusting constituent) (II), is obtained by reacting the intermediate product <r> with (i) acid chloride such as methacryloyl chloride and acryloyl chloride, or (ii) acid anhydride such as methacrylic anhydride and acrylic anhydride.

(6) Synthesis of Polysiloxane <u> (Compound (II))

The polysiloxane <u> represented by the following formula, as one of compounds (adjusting constituent) (II), is obtained by reacting the intermediate product <s> with unsaturated carboxlic acid such as methacrylic acid and acrylic acid.

In summary, the polysiloxane <t> or <u>, as the adjusting constituent (II) contained in the adhesive of the present invention, is synthesized in the following reaction path.

The present adhesive further contains one or more photoinitiators for polymerizing the at least one photo-hardenable silicone oil (I), and additionally the at least one adjusting constituent (II), and thereby hardening the adhesive. The photoinitiators absorb ultraviolet, and thereby initiate the polymerization of the constituents, namely, the hardening of the adhesive. Preferably is used a photoinitiator having an ultraviolet absorption region of 300 to 450 nm. The recommendable photoinitiators are as follows:

1-(4-isopropylphenyl)-2-hydroxy-2-methylpropane-1-on and 2-hydroxy-2-methyl-1-phenylpropane-1-on; 1-hydroxycyclohexylphenylketone; acetophenone, and its derivatives such as dichloroacetophenone, trichloroacetophenone, dialkoxyacetophenone, 2, 2-dimethoxy-2-phenylacetophenone, and 4-dialkylaminoacetophenone; benzophenone, and its derivatives such as 4, 4'-bis(dimethylamino)benzophenone (Michler's ketone) and 4, 4'-bis(diethylamino)benzophenone; benzil; benzoin, and its derivatives such as benzoin alkyl ether; benzil dimethylketal; benzoylbenzoate; α-acyloxime esters; tetramethylthiuram monosulfide; thioxanthone, and its derivatives such as 2-chlorothioxanthone and diethylthioxanthone; azo-compounds such as azobisisobutyronitrile; benzoyl peroxide, and its derivatives such as di-tert-butyl peroxide; and benzoyldiethoxyphosphine oxide and trimethylbenzoyldiphenylphosphine oxide. The photoinitiators may be used solely or in combination.

In the above-indicated various photoinitiators, preferably is/are used one or more selected from (a) benzil, (b) benzophenone, (c) acetophenone, and (d) azobisisobutyronitrile.

The ultraviolet-hardenable adhesive contains 0.1 to 10 parts by weight of the at least one photoinitiator per 100 parts by weight of the at least one photo-hardenable silicone oil (I). Preferably the adhesive contains 0.5 to 2 parts by weight of the at least one photoinitiator per 100 parts by weight of the at least one silicone oil. If the proportion of the at least one photoinitiator used is below the lower limit, 0.1 part by weight, the time needed to harden the adhesive is increased to be excessively long. Meanwhile, if the proportion is above the upper limit, 10 parts by weight, the hardening characteristics of the adhesive is saturated, namely, is no longer improved, but on the other hand the cost of the product (ultraviolet-hardenable adhesive) is raised.

The present ultraviolet-hardenable adhesive may contain at least one photosensitizer in addition to the at least one photoinitiator. The photosensitizer itself is not activated due to exposure to ultraviolet, but when the photosensitizer is used together with the photoinitiator the photoinitiator more effectively acts upon exposure to ultraviolet than when used solely. The preferable photosensitizers are as follows: amines such as n-butylamine, di-n-butylamine, trimethylamine, and triethylamine; tri-n-butylphosphine; allylthiourea; s-benzylisothiuram-p-toluene sulfinate; and diethylaminoethyl methacrylate.

The ultraviolet-hardenable adhesive may additionally contain at least one of stabilizer, filler, and other adhesive additives such as pigment, inert organic polymer, thermal-polymerization inhibitor, and solvent.

The ultraviolet-hardenable adhesive having the composition described above is used to bond a water-swellable, ophthalmic-lens blank to a support member. The bonded articles are exposed to ultraviolet rays at an appropriate time to initiate the polymerization and thereby secure the lens blank to the support member. The ultraviolet exposure is effected by utilizing ultraviolet rays of about 200 to 450 nm generated by an exposing device such as a high-pressure mercury lamp or a metal-halide lamp. The exposure is continued for about 20 seconds to 10 minutes so as to polymerize the at least one silicone oil (I) and at least one adjusting constituent (II) and thereby harden the adhesive.

The water-swellable lens blank secured to the support member is subjected to workings such as machining and polishing, and/or necessary treatments, so as to form the lens blank into a desired ophthalmic lens.

Figure 1:
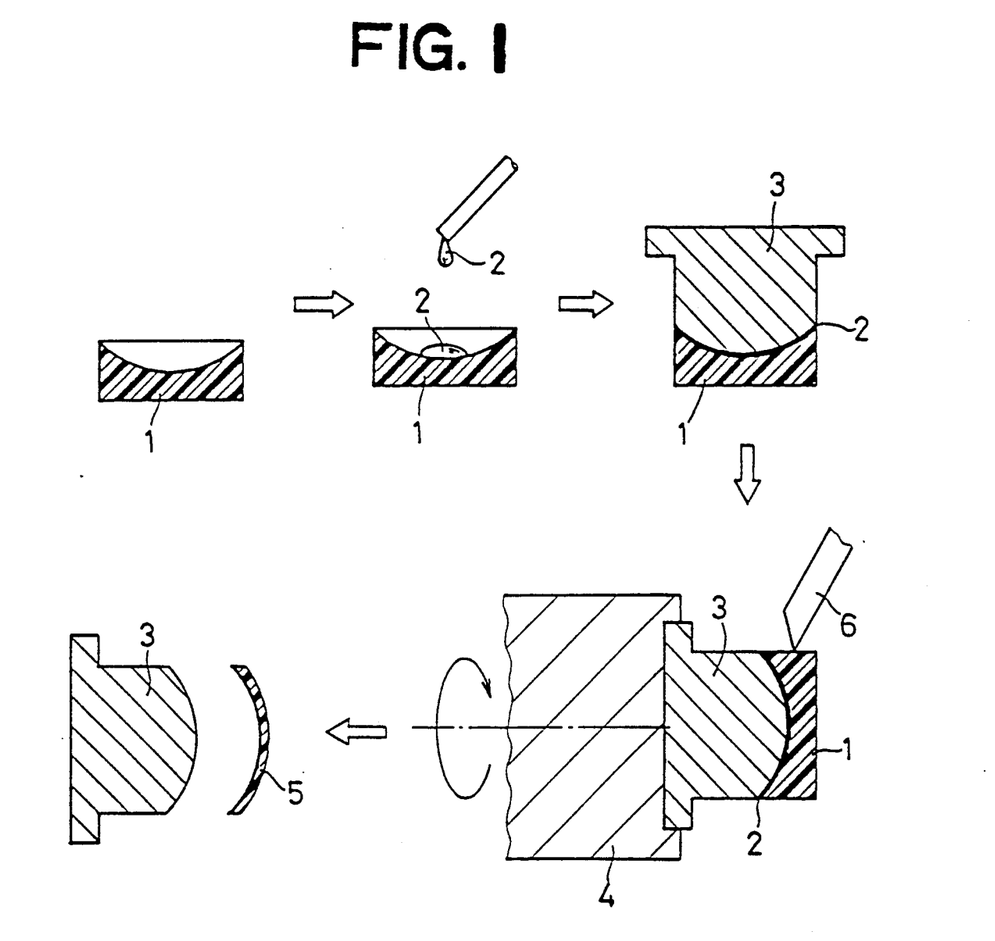
FIG. 1 is an illustrative view of some steps carried out to work a water-swellable ophthalmic-lens block into a required water-swellable ophthalmic lens.

Referring to FIG. 1, there are illustrated some steps of producing a water-swellable ophthalmic lens using the above-described ultraviolet-hardenable adhesive. Reference numeral 1 designates a water-swellable, ophthalmic-lens blank or block having a shaped inner surface. Some drops of the adhesive 2 are put on the inner surface of the lens block 1. Subsequently, a support member 3 having a curvature substantially equal to that of the inner surface of the lens block 1, is superposed on the lens block 1 such that the lens block 1 is accurately positioned relative to the support member 3. The bonded lens block 1 and support member 3 are exposed to ultraviolet rays generated by an exposing device, so as to harden the adhesive and thereby secure the lens block 1 to the support member 3. After the adhesive has been sufficiently hardened, the support member 3 supporting the lens block 1 thereon is mounted on a spindle 4 of a machine tool so that the lens block 1 is subjected to workings such as machining and polishing, and/or necessary treatments. Thus, the lens block 1 is worked into a desired ophthalmic lens 5. Reference numeral 6 designates a cutting tool. The ultraviolet exposure of the adhesive may be effected either from the side of the lens block 1 or from the side of the support member 3. In the latter case, it is preferred that the support member 3 consist of a transparent, colorless member.

After the lens block 1 has been formed into the desired ophthalmic lens 5 by working and/or treatment, the support member 3 is removed from the spindle 4, and then the lens 5 is separated from the support member 3. The lens 5 is advantageously separated from the support member 3 by immersing the bonded lens 5 and support member 3 in a suitable non-polar solvent or an aqueous solution, for 20 seconds to 10 minutes. Preferably the non-polar solvent consists of benzine, n-hexane, hydrocarbon halide, hexamethyldisiloxane, benzene or toluene. In particular, the benzine, n-hexane and hydrocarbon halide are recommendable. It is also preferred that the aqueous solution be water, or water containing salt. It is recommended that the temperature of the solvent used be maintained at room temperature to 45° C. In addition, an ultrasonic generator may be used, as needed, to facilitate the separation of the lens from the support member.

There will be described some examples in accordance with the present invention. However, it is to be understood that the present invention is by no means limited to the particularities of those examples. The terms "part(s)" and "%" (percentage) used in the following description are on a weight basis, namely, mean part(s) by weight and % by weight, respectively.

EXAMPLES

Part A

17

EXAMPLE A1

Synthesis of Silicone Oil (I)

(1) Synthesis of Intermediate Product <a>

0.32 g of hexamethyldisiloxane, and subsequently 297 g of octamethylcyclotetrasiloxane and 60 g of 1, 3, 5, 7-tetramethylcyclotetrasiloxane, were charged or put into a flask. In addition, 5 ml of concentrated sulfuric acid was put in the flask. The mixture in the flask was stirred at 30° C. for 24 hours so that the reaction advanced in the flask. Subsequently, 3 of n-hexane was added to the viscous liquid in the flask, which liquid contains the reaction product, so as to dilute the viscous liquid. The diluted solution was purified or cleaned with 1% sodium-hydroxide water solution whose volume was three times the volume of the diluted solution.

Next, anhydrous sodium sulfate was added to the washed n-hexane solution. Thus, the solution was dehydrated and dried for one night. Finally, a vacuum pump was used to completely remove the solvent (i.e., n-hexane) and thereby obtain the intermediate product <a>, that is, 288 g of polysiloxane (1) wherein each of $R_1$ to $R_2$, $R_3$, and $n_1$ is from 400 to 600; and $n_2+n_3$ is from 100 to 150.

(2) Synthesis of Intermediate Product <d>

114 g of allylglycidyl ether and 118 g of α-methylstyrene were put in a three-necked flask. Meanwhile, 1 g of $H_2PtCl_6 \cdot H_2O$ was dissolved in 30 ml of isopropanol, and four or five drops of the solution were used as a catalyst after the isopropanol was removed from the drops. The catalyst was dissolved in the mixture of allyl glycidyl ether and α-methylstyrene.

Next, a dropping funnel was attached to one of the three necks of the flask, and 200 g of polysiloxane (1) was put in the funnel. Subsequently, the temperature in the flask was increased to 60° C. to 80° C. While nitrogen gas was blown into the flask, the polysioxane (1) was dropped into the mixture in the flask over two hours. After the dropping, the temperature in the flask was raised to 100° C. The mixture in the flask was stirred at the raised temperature for three hours, so that the reaction advanced in the flask. Thereafter, the surplus allyl glycidyl ether and α-methylstyrene were removed using an evaporator from the produced liquid containing the reaction product, and then 4.5 l of n-hexane was added to dilute the residual liquid. The diluted solution was cleaned with purified water whose volume is three times the volume of the diluted solution.

Next, sodium sulfate was added to the cleaned n-hexane solution to dehydrate and dry the solution. Subsequently, the sodium sulfate was removed from the n-hexane solution by subjecting the solution to filtration. Thereafter, the n-hexane is removed using an evaporator, that is, the solvent is removed from the reaction product. Finally, the solvent is completely removed using a vacuum pump, so as to obtain the intermediate product <d>, that is, 196 g of polysiloxane (2) wherein each of $R_1$ to $R_3$ is —$CH_3$; $B_1$ is ;
$n_1$ is from 400 to 600; $n_2$ is from 50 to 75; and n, is from 50 to 75.

(3) Synthesis of Polysiloxane <f>

18

180 g of thus-obtained polysiloxane (2) was put in a three-necked flask (200 ml) to which a Dimroth condenser and a thermometer have been attached. Subsequently, 160 g of methacrylic acid was added in the flask. The mixture in the flask was stirred at 125° C. for 2 hours, so that the reaction advanced in the flask.

6 l of n-hexane was added to dilute thus-obtained liquid containing the reaction product, and the diluted solution was cleaned with 1% sodium-hydroxide water solution whose volume is three times the volume of the diluted solution, and once more cleaned with purified water. Thereafter, a large amount of anhydrous sodium sulfate was added to the solution. Thus, the solution was dehydrated and dried for one night.

After the dehydration and drying, the sodium sulfate was removed by filtration, and the n-hexane was removed using an evaporator. Finally, the solvent was completely removed using a vacuum pump. Thus, was obtained 172 g of the target silicone oil <f>, that is, polysiloxane (3) wherein each of $R_1$ to $R_3$ is —$CH_3$; $A_1$ is $CH_2$=$C(CH3)$—COO—; $X_1$ is $B_1$ is $n_1$ is from 400 to 600; $n_2$ is from 50 to 75; and $n_3$ is from 50 to 75.

EXAMPLE A2

Synthesis of Silicone Oil (I)

1) Synthesis of Intermediate Product <a>

0.32 g of hexamethyldisiloxane, and subsequently of octamethylcyclotetrasiloxane and 80 g of 1, 3, 5, 7-tetramethylcyclotetrasiloxane, were put in a flask. In addition, 5 ml of concentrated sulfuric acid was put in the flask. The mixture in the flask was stirred at 30° C. for 24 hours so that the reaction advanced in the flask. Thereafter, 3 l of n-hexane was added to the viscous liquid in the flask, which liquid contains the reaction product, so as to dilute the viscous liquid. The diluted solution was cleaned with 1% sodium-hydroxide water solution whose volume was three times the volume of the diluted solution.

Next, anhydrous sodium sulfate was added to the cleaned n-hexane solution. Thus, the solution was dehydrated and dried for one night. Finally, a vacuum pump was used to completely remove the solvent (i.e., n-hexane) and thereby obtain the intermediate product <a>, that is, 256 g of polysiloxane (4) wherein each of $R_1$ to $R_3$ is —$CH_3$; $n_1$ is from 350 to 530; and $n_2+n_3$ is from 130 to 200.

(2) Synthesis of Intermediate Product <b>

65 g of trimethylsilyloxyallyl and 236 g of allylbenzene were put in a three-necked flask. Meanwhile, 1 g of $H_2PtCl_6 \cdot H_2O$ was dissolved in 30 ml of isopropanol, and four or five drops of the solution were used as a catalyst after the isopropanol was removed from the drops. The catalyst was dissolved in the mixture of trimethylsilyloxyallyl and allylbenzene.

Next, a dropping funnel was attached to one of the three necks of the flask, and 200 g of polysiloxane (4) was put in the funnel. Subsequently, the temperature in the flask was increased to 60° C. to 80° C. While nitrogen gas was blown into the flask, the polysioxane (4) was dropped into the mixture in the flask over 2 hours and 30 minutes. After the dropping, the temperature in the flask was raised to 100° C. The mixture in the flask was stirred at the raised temperature for 3 hours, so that the reaction advanced in the flask. Thereafter, the surplus trimethylsilyloxyallyl and allylbenzen were removed using an evaporator from the produced liquid containing the reaction product, and then 4 l of n-hexane was added to the residual liquid to dilute the liquid. The diluted solution was cleaned with purified water.

Next, sodium sulfate was added to the cleaned n-hexane solution to dehydrate and dry the solution. Subsequently, the sodium sulfate was removed from the n-hexane solution. Further, the solvent (i.e., n-hexane) was removed, so as to obtain the intermediate product $<b>$, that is, 208 g of polysiloxane (5) wherein each of $R_1$ to $R_3$ and $R_9$ is —$CH_3$; $B_1$ is $n_1$ is from 350 to 530; $n_2$ is from 20 to 32; and $n_3$ is from 108 to 168.

(3) Synthesis of Polysiloxane $<c>$ 100 g of thus-obtained polysiloxane (5) was diluted with 1,000 ml of chloroform, and subsequently 2,000 ml of 5% hydrochloric-acid water solution is added thereto. While the mixture was stirred at room temperature for 24 hours, the hydrolysis of the polysiloxane advanced. Subsequently, the chloroform solution was cleaned with 1% sodium-hydroxide water solution, and then anhydrous sodium sulfate was added to dehydrate and dry the cleaned solution. Further, the solvent (i.e., chloroform) was removed, so as to obtained the intermediate product $<c>$, that is, 78 g of polysiloxane (6) wherein each of $R_1$ to $R_3$ is —$CH_3$; $B_1$ is $n_1$ is from 350 to 530; n, is from 20 to 32; and $n_3$ is from 108 to 168.

Part B

EXAMPLE B

Synthesis of Compound (II)

(1) Synthesis of Intermediate Product $<p>$ 0.32 g of hexamethyldisiloxane, and subsequently 308 g of octamethylcyclotetrasiloxane and 30 g of 1, 3, 5, 7-tetramethylcyclotetrasiloxane, were put in a flask. In addition, 5 ml of concentrated sulfuric acid was put in the flask. The mixture in the flask was stirred at 30° C. for 24 hours so that the reaction advanced in the flask. Thereafter, 3 l of n-hexane was added to the viscous liquid in the flask, which liquid contains the reaction product, so as to dilute the viscous liquid. The diluted solution was cleaned with 1% sodium-hydroxide water solution whose volume was three times the volume of the diluted solution.

Next, anhydrous sodium sulfate was added to the washed n-hexane solution. Thus, the solution was dehydrated and dried for one night. Finally, a vacuum pump was used to completely remove the solvent (i.e., n-hexane) and thereby obtain the intermediate product $<p>$, that is, 276 g of polysiloxane (7) wherein each of $R_5$ to $R_7$ is —$CH_3$; $n_4$ is from 410 to 630; and $n_5$ is from 45 to 75.

(2) Synthesis of Intermediate Product $<q>$ 29 g of trimethylsilyloxyallyl was put in a three-necked flask. Meanwhile, 1 g of $H_2PtCl_6 \cdot H_2O$ was dissolved in 30 ml of isopropanol, and four or five drops of the solution were used as a catalyst after the isopropanol was removed from the drops. The catalyst was dissolved in the trimethylsilyloxyallyl in the flask.

Next, a dropping funnel was attached to one of the three necks of the flask, and 200 g of polysiloxane (7) was put in the funnel. Subsequently, the temperature in the flask was increased to 60° C. to 80° C. While nitrogen gas was blown into the flask, the polysiloxane (7) was dropped into the flask over 2 hours and 30 minutes. After the dropping, the temperature in the flask was raised to 100° C.. The mixture in the flask was stirred at the raised temperature for three hours, so that the reaction advanced in the flask. Thereafter, the surplus trimethylsilyloxyallyl was removed from the produced liquid containing the reaction product, and then 4 l of n-hexane was added to the residual liquid to dilute the liquid. The diluted solution was cleaned with purified water.

Next, anhydrous sodium sulfate was added to the cleaned n-hexane solution to dehydrate and dry the solution. Subsequently, the sodium sulfate was removed from the n-hexane solution. Furthermore, the solvent (i.e., n-hexane) was removed, so as to obtain the intermediate product $<q>$, that is, 196 g of polysiloxane (8) wherein each of $R_5$ to $R_7$ and $R_9$ is —$CH_3$; $n_4$ is from 410 to 630; and $n_5$ is from 45 to 75.

(3) Synthesis of Intermediate Product $<s>$ 100 g of thus-obtained polysiloxane (8) was diluted with 1,000 ml of chloroform, and subsequently 2,000 ml of 5% hydrochloric-acid water solution is added thereto. The mixture was stirred at room temperature for 24 hours, so that the hydrolysis of the polysiloxane advanced. Subsequently, the chloroform solution containing the reaction product was cleaned with 1% sodium-hydroxide water solution, and then anhydrous sodium sulfate was added to dehydrate and dry the washed solution. Further, the solvent (i.e., chloroform) was removed, so as to obtained the intermediate product $<s>$, that is, 76 g of polysiloxane (9) wherein each of $R_5$ to $R_7$ is —$CH_3$; $n_4$ is from 410 to 630; and $n_5$ is from 45 to 75.

(4) Synthesis of Polysiloxane $<t>$ 50 g of above-obtained polysiloxane (9) was put in a three-necked flask, and was diluted with 160 ml of toluene. In addition, 33 g of triethylamine was added thereto. A dropping funnel was attached to one of the three necks of the flask, and 35 g of methacryloyl chloride was dropped into the mixture in the flask through the dropping funnel, over 1 hour and 30 minutes, while the mixture was stirred at room temperature. The stirring was further continued for 2 hours and 30 minutes after the dropping, so that the reaction advanced in the flask.

Subsequently, the triethylamine hydrochloride was removed from the obtained liquid containing the reaction product, and the residual liquid was cleaned with purified water. Thereafter, anhydrous sodium sulfate was added to dehydrate and dry the liquid.

Next, the sodium sulfate was removed, and further the solvent (i.e., toluene) was removed, so as to obtain the polysiloxane <t>, that is, 56 g of polysiloxane (10) wherein each of $R_5$ to $R_7$ is —$CH_3$; $A_2$ is $n_4$ is from 410 to 630; and $n_5$ is from 45 to 75.

Part C

EXAMPLE C1

100 parts of the polysiloxane (3) of Example A1, as the photo-hardenable silicone oil, was mixed with 2 parts of 1-(4-isopropylphenyl)-2-hydroxy-2-methylpropane-1-on, as the photoinitiator, to prepare an ultraviolet-hardenable adhesive in accordance with the present invention.

3 μl of thus obtained adhesive was dropped on the shaped inner surface of a water-swellable lens blank or block for a contact lens. The lens block can be swollen as a result of absorbing water. At this stage the lens block is not in its swollen state, but in its normal, non-swollen state. The lens block has a maximum water content of 70%, namely, is capable of containing or absorbing 70 parts of water per 100 parts of the sum of the contained water and proper or initial material of the lens block. A support member having a curved surface whose curvature is substantially equal to that of the inner surface of the lens block, was superposed on the lens block such that the curved surface of the support member is accurately positioned relative to the inner surface of the lens block. Then, the bonded lens block and support member were held 25 cm below a 1 kw-power and 80 cm length mercury lamp, and exposed to ultraviolet rays emitted by the lamp for about 30 seconds, so as to harden the adhesive and thereby secure the lens block to the support member. Subsequently, the support member supporting the lens block thereon was mounted on a spindle of a machine tool, and the lens block was machined and polished. Thus, the lens block was worked into a desired ophthalmic lens. These operations were carried out without producing any problems. That is, it was demonstrated that the ultraviolet-hardenable adhesive exhibits an excellent bonding characteristic, namely, a sufficient bonding force.

Next, the support member having the produced lens adhered thereto, was immersed in benzine for 10 minutes. As a result it was found that the lens was completely separate from the support member. Then, the surfaces of the lens were inspected with a magnifying glass of 10 magnifications. The inspection showed that the surfaces of the lens were smooth and did not have any influences from the adhesive or the benzine.

EXAMPLE C2

With the ultraviolet-hardenable adhesive of Example C1, a lens block was adhered to a support member like Example C1, except that the exposure to ultraviolet rays was continued for 1 minute. The working of the lens block into a desired lens, by machining and/or polishing, was carried out without any problems.

After the above working, the support member having the worked lens thereon was immersed in Freon (fluorohydrocarbon) for 10 minutes. When the support member and lens were removed from the solution, it was found that the two articles were completely separate from each other. The surfaces of the lens were smooth.

EXAMPLE C3

With the ultraviolet-hardenable adhesive of Example C1, a lens block having a maximum water content of 80% was adhered to a support member like Example C1. The working of the lens block into a desired lens, by machining and/or polishing, was carried out without any problems.

After the above working, the support member having the worked lens thereon was immersed in n-hexane like Example C1. The support member and the lens were completely separated from each other without any problems. The surfaces of the lens were smooth.

EXAMPLE C4

The ultraviolet-hardenable adhesive of Example C1 was applied to the shaped concave surface of a lens block having a maximum water content of 80%, and subsequently the lens block was bonded to a glass member having a curvature substantially equal to that of the concave surface of the lens block. The bonded lens block and glass member were exposed to ultraviolet rays emitted by a black-light lamp for 5 minutes, so as to harden the adhesive and thereby secure the lens block to the glass member. The curvature of the concave surface of the lens block was measured two times, one before the bonding, and another after the hardening of the adhesive. The test results on three lens blocks are indicated in TABLE I. It was proved that the curvature of the concave surface of the lens block was not influenced by the bonding of the lens block to the support member or the hardening of the adhesive.

TABLE I

| No. | Curvature of Inner Surface (mm) | | |
|---|---|---|---|
| | Before Bonding | After Hardening | Difference |
| 1 | 5.85 | 5.86 | +0.01 |
| 2 | 5.87 | 5.86 | −0.01 |
| 3 | 5.86 | 5.86 | 0 |

EXAMPLES C5–C8

The polysiloxane (3) of Example A1 (photo-hardenable silicone oil (I)) in various proportions was mixed with the polysiloxane (10) (adjusting constituent (II)) in various proportions, so as to prepare various ultraviolet-hardenable adhesives (Examples C5–C8) in accordance with the invention. The proportions of the compounds (3) and (10) of each example are indicated in TABLE II.

As the photoinitiator, was used 2 parts of 1-(4-isopropylphenyl)-2-hydroxy-2-methylpropane-1-on per 100 parts of the sum of the two compounds (3) and (10).

The working and separation tests using the adhesives C5–C8 were carried out like Example C1. The test results are shown in TABLE II.

The bonding characteristic of an adhesive was evaluated by immersing the produced (worked) lens bonded to the support member in benzine, and measuring a time needed for separation of the lens from the support member. A fraction less than 1 minute of each measured time was raised to 1 minute.

As is apparent from the test results shown in TABLE II, the bonding characteristic or force of the adhesives of the invention is easily adjusted by mixing the photo-hardenable silicone oil with the adjusting constituent, namely, two kinds of polysiloxanes (I) and (II).

TABLE II

| EX. | POLYSILOXANE (3) (SILICONE OIL (I)) (parts) | POLYSILOXANE (10) (ADJUSTING CONSTITUENT (II)) (parts) | PHOTO-INITIATOR (parts) | ADHESIVE-NESS EVALUATION |
| --- | --- | --- | --- | --- |
| C5 | 90 | 10 | 2 | good |
| C6 | 70 | 30 | 2 | good |
| C7 | 50 | 50 | 2 | good |
| C8 | 30 | 70 | 2 | generally good |

Part D

COMPARATIVE EXAMPLE D1

3 μl of a commercially available, cyanoacrylate-type adhesive ("ARON ALPHA #102" available from TOA GOSEI KAGAKU KOGYO K.K., Japan), was dropped onto the shaped concave surface of a water-swellable lens block (in its non-swollen state). A support member having a curved surface whose curvature is substantially equal to that of the concave surface of the lens block, was superposed on the lens block. Instantly the lens block was secured to the support member. The working of the lens block into a desired lens, by machining and polishing, was carried out.

After the working, however, the lens was not able to be separated from the support member without damaging the lens.

COMPARATIVE EXAMPLE D2

Using a commercially available, photo-hardenable adhesive ("THREE BOND 3001" available from THREE BOND K.K., Japan), a water-swellable lens block was bonded to a support member like Example C1, and the bonded lens block and support member were subjected to ultraviolet exposure to harden the adhesive and thereby secure the lens block to the support member.

Although the lens block was secured to the support member with a sufficient bonding force, it was found by a lateral observation that the adhesive penetrated into the lens block and thereby damaged the optical surface (e.g., concave surface) of the lens block.

COMPARATIVE EXAMPLE 3

Using a commercially available, photo-hardenable (urethane modified acrylate-type) adhesive ("FMD-11" available from NIHON ROKKUTAITO K.K., Japan), a water-swellable lens block in its non-swollen state was bonded to a support member like Example C1, and the bonded articles were exposed to ultraviolet rays to harden the adhesive and thereby secure the lens block to the support member. Although the lens block was secured to the support member with a sufficient bonding force, it was found by a lateral observation that the adhesive penetrated into the lens block and thereby damaging the optical surface of the lens block.

It is to be understood that the present invention may be embodied with various modifications, changes and improvements that may occur to those skilled in the art without departing from the spirit and scope of the invention defined in the appended claims.

What is claimed is:

1. An ultraviolet-hardenable adhesive used for bonding a water-swellable, ophthalmic-lens blank to a support member, in producing a water-swellable ophthalmic lens, consisting essentially of:
   at least one photo-hardenable silicone oil;
   at least one photoinitiator; and
   at least one adjusting constituent for adjusting a bonding force produced by the adhesive, said at least one silicone oil being selected from the group consisting of polysiloxanes represented by the following formula (I):

wherein each of $R_1$ to $R_3$ is methyl or ethyl;
$n_1$, $n_2$ and $n_3$ are positive integers, respectively, which satisfy the following formulas:

$$40 \leq n_1 + n_2 + n_3 \leq 1500$$

$$0.04 \leq \frac{n_2}{n_1 + n_2 + n_3} \leq 0.6$$

$$0.002 \leq \frac{n_3}{n_1 + n_2 + n_3} \leq 0.2$$

$X_1$ is $-(CH_2)_3-$, or $A_1$ is wherein $R_4$ is hydrogen or methyl; and
$B_1$ is

-continued

, or and said at least one adjusting constituent being represented by the following general formula (II):

(II)

wherein each of $R_5$ to $R_7$ is methyl or ethyl; $n_4$ and $n_5$ are positive integers, respectively, which satisfy the following formulas:

$$40 \leq n_4 + n_5 \leq 1500$$

$$0.002 \leq \frac{n_5}{n_4 + n_5} \leq 0.2;$$

$X_2$ is $-(CH_2)_3-$, or and
$A_2$ is wherein $R_8$ is hydrogen or methyl.

2. The ultraviolet-hardenable adhesive as set forth in claim 1, wherein said $n_1$, $n_2$ and $n_3$ are positive integers, respectively, which satisfy the following formulas:

$$70 \leq n_1 + n_2 + n_3 \leq 680$$

$$0.08 \leq \frac{n_2}{n_1 + n_2 + n_3} \leq 0.2$$

$$0.05 \leq \frac{n_3}{n_1 + n_2 + n_3} \leq 0.1$$

3. The ultraviolet-hardenable adhesive as set forth in claim 1, further comprising at least one photosensitizer.

4. The ultraviolet-hardenable adhesive as set forth in claim 1, wherein said $n_4$ and $n_5$ are positive integers, respectively, which satisfy the following formulas:

$$70 \leq n_4 + n_5 \leq 680$$

$$0.05 \leq \frac{n_5}{n_4 + n_5} \leq 0.1$$

5. The ultraviolet-hardenable adhesive as set forth in claim 1, wherein the ultraviolet-hardenable adhesive contains up to 80 parts by weight of said at least one adjusting constituent, the sum of the at least one silicone oil and the at least one adjusting constituent being 100 parts by weight.

6. The ultraviolet-hardenable adhesive as set forth in claim 5, wherein the ultraviolet-hardenable adhesive contains 70 to 80 parts by weight of said at least one photo-hardenable silicone oil and 30 to 20 parts by weight of said at least one adjusting constituent, per 100 parts by weight of the sum of said at least one silicone oil and said at least one adjusting constituent.

7. The ultraviolet-hardenable adhesive as set forth in claim 1, further comprising at least one of stabilizer, filler and other adhesive additives.

* * * * *